United States Patent

Sterzel et al.

[11] Patent Number: 5,840,641
[45] Date of Patent: Nov. 24, 1998

[54] PREPARATION OF PULVERULENT ZIRCONIUM DIOXIDE

[75] Inventors: Hans-Josef Sterzel, Dannstadt-Schauernheim; Werner Hesse, Obrigheim, both of Germany

[73] Assignee: BASF Aktiengesellschaft, Ludwigshafen, Germany

[21] Appl. No.: 851,346

[22] Filed: May 6, 1997

[30] Foreign Application Priority Data

May 15, 1996 [DE] Germany ............ 196 19 638.8

[51] Int. Cl.$^6$ ............ C04B 35/48; C01G 25/02
[52] U.S. Cl. ............ 501/103; 501/152; 423/608
[58] Field of Search ............ 423/608; 501/103, 501/152

[56] References Cited

FOREIGN PATENT DOCUMENTS

| 2 026 521 | 3/1991 | Canada . |
| 2 029 707 | 5/1991 | Canada . |
| 251 538 | 1/1988 | European Pat. Off. . |
| 517 437 | 12/1992 | European Pat. Off. . |
| 37 06 172 | 2/1987 | Germany . |
| 61-289130 | 12/1986 | Japan . |
| 2-302320 | 12/1990 | Japan ............ 423/608 |
| 6-321541 | 11/1994 | Japan ............ 423/608 |

OTHER PUBLICATIONS

JAPIO Patent Abstract No. JP361289130A which is an abstract of Japanese Patent Specification No. 61–289130 (Dec. 1986).

English translation of JP 61 289130 (Dec. 1986).

JAPIO abstract of Japanese Patent No. 61 289130 (Dec. 1986).

Kirk–Othmer Enc. of Chem. Tech., 3$^{rd}$ Ed., vol. 24 [No Date].

*Primary Examiner*—Anthony Green
*Attorney, Agent, or Firm*—Keil & Weinkauf

[57] ABSTRACT

In the preparation of pulverulent zirconium dioxide by dissolving a zirconium compound in formic acid, removing the volatile components and calcining the residue, a chloride-free zirconium compound is dissolved in a formic acid/water mixture and the zirconium dioxide is obtained in a manner known per se.

11 Claims, No Drawings

PREPARATION OF PULVERULENT ZIRCONIUM DIOXIDE

The present invention relates to a process for preparing pulverulent zirconium dioxide by dissolving a zirconium compound in formic acid, removing the volatile components and calcining the residue. The invention further relates to a process for preparing stabilized pulverulent zirconium dioxide whose tetragonal modification is stabilized against transformation into the monoclinic modification by a stabilizing additive.

Owing to its properties, zirconium dioxide is used to an increasing extent in application areas in which high mechanical, thermal and chemical stability of the material are required. For example, zirconium dioxide can be used alone or in admixture with other oxides as a material for producing shaped bodies of sintered ceramic. The zirconium dioxide powder used for these sintered bodies is generally used in stabilized form, whereby the tetragonal high-temperature modification is retained even on cooling to use temperatures. To achieve this stabilization, the zirconium dioxide powder is doped with other oxides such as yttrium oxide, cerium oxide, oxides of the rare earths, calcium oxide, magnesium oxide or with mixtures of these. In order that the green bodies produced from the stabilized zirconium dioxide, for example by pressing, injection molding or slip casting, have the desired sintering behavior and the sintered shaped bodies have the desired good mechanical, thermal and chemical properties, it is necessary that the oxide added is distributed as uniformly as possible in the zirconium dioxide lattice. In addition, for good processability, the powder has to be able to form free-flowing preparations and the powder particles should comprise loose agglomerates. Furthermore, to obtain optimum properties of the shaped bodies of sintered ceramic, it is essential that the zirconium dioxide powder used is free of impurities such as chlorides or sulfates.

To prepare zirconium dioxide, it is usual, in a first step, to dissolve a zirconium compound such as zirconyl chloride in a solvent such as water. In a second step, the soluble zirconium compound is subsequently reacted to form a zirconium compound which is sparingly soluble in the solvent concerned and from which zirconium dioxide can be obtained by calcination, eg. by hydrolysis with an increase in temperature to give the sparingly soluble hydrated zirconium oxide. As a third process step, the insoluble zirconium compound has to be separated from the supernatant solution before calcination. As a fourth process step, it is necessary to remove impurities which would lead to impairment of the properties of workpieces produced using the zirconium dioxide thus obtained. This is followed by, as fifth process step, the calcination of the precipitate and its conversion into zirconium dioxide. Since in this process the precipitate is usually obtained in the form of coarse agglomerates, after calcination the zirconium dioxide has to be milled to the desired particle size in a last, sixth process step. Examples of this procedure may be found, for example, in the European Patent Applications Nos. 251 538 and 517 437 or in German Patent No. 37 06 172. The main disadvantage of these processes is that they generally include a plurality of complicated and costly mechanical process steps such as filtration, washing and milling.

Likewise known are processes which circumvent the precipitation of a sparingly soluble precipitate, its filtration and washing. The known processes of this type likewise use zirconyl chloride as starting compound. Thus, EP-A-421 077 teaches dissolving zirconyl chloride in a melt of ammonium chloride, evaporating this melt and milling the residue. According to the process disclosed in EP-A-427 938, a solution of zirconyl chloride in formic acid is converted into zirconium dioxide by evaporation and calcination of the residue. The main disadvantage of these processes is that the preparation of a chloride-free zirconium dioxide is only possible at very great expense.

It is an object of the present invention to find a process which makes it possible to prepare chloride-free zirconium dioxide powder while avoiding complicated mechanical process steps. Furthermore, it is an object of the present invention to find a process which makes it possible, while avoiding mechanically complicated process steps, to prepare chloride-free zirconium dioxide to which a stabilizer which stabilizes the tetragonal modification of zirconium dioxide against transformation into the monoclinic modification can be added before, during or after the process of the present invention.

We have found that this object is achieved by a process for preparing pulverulent zirconium dioxide by dissolving a zirconium compound in formic acid, removing the volatile components and calcining the residue, wherein a chloride-free zirconium compound is dissolved in a formic acid/water mixture and the pulverulent zirconium dioxide is obtained therefrom in a manner known per se.

It has surprisingly been found that chloride-free zirconium compounds can be dissolved in a formic acid/water mixture in high concentrations and without leaving a residue to give clear solutions which are very suitable for further processing.

The process of the present invention can be carried out as follows:

In a first step, the chloride-free zirconium compound, eg. hydrated zirconium oxide or basic zirconium carbonate, is dissolved in a formic acid/water mixture. The molar ratio of formic acid:water in this solvent is generally from 1:1 to 1:3, preferably from 1:1.5 to 1:2.5 and very particularly preferably from 1:1.8 to 1:2.2. The optimum dissolution temperature is in the range from 50° to 950° C., preferably in the range from 70° to 85°C. In general, the mixture of formic acid and water is initially charged and the solids are added thereto. However, the reverse order is likewise possible. When carbonate is used, the rate of addition is set such that the contents of the reactor just do not foam over. To dissolve 1 kg of basic zirconium carbonate, it is possible to use, for example, 0.4 kg of water and 0.5 kg of formic acid to give a low-viscosity, clear solution. It is likewise possible to use only 0.24 kg of water and 0.307 kg of formic acid per kilogram of zirconium carbonate; this gives a highly viscous, but likewise clear solution which can readily be processed further.

In a second step, the vaporizable constituents of this solution are removed. This removal of the volatile components can be carried out by simple evaporation, but for the preparation of zirconium dioxide powders it is generally convenient and advantageous to spray dry the solution.

In a third step, the solid is subsequently calcined to give zirconium dioxide. Spray drying and calcination are process steps known per se and can be carried out in a manner known per se.

In the process of the present invention, comparatively high concentrations of the solids in the solution are preferred. The solution before spray drying should advantageously have a content of zirconium compound, calculated as zirconium dioxide, of at least 25% by weight, preferably from 30 to 40% by weight. In this case, the spray drying process is not only particularly economical, but the increased viscosity of the starting solution surprisingly leads to a spray-dried powder which can be calcined without caking at high temperatures, eg. 750°–1350° C. and preferably 950°–1250° C. This behavior is in turn very favorable since such powders calcined at high temperature can be more easily incorporated into ceramic formulations, in particular injection-molding compositions. Lower viscosities of the injection-molding compositions and higher proportions by volume of solids and thus a higher sintering activity and a decreased shrinkage on sintering are then achieved.

Caked powders calcined at high temperature can in principle be converted into powders suitable for further processing by deagglomeration, customarily by milling in a ball mill. This step is very complicated and costly. In addition, the powder is, disadvantageously, contaminated with abraded material from the mill and milling media which impairs the quality of shaped ceramic bodies comprising this powder. It is an advantage of the method of the present invention that this milling step can be shortened substantially. Milling times of from 30 to 90 minutes are completely adequate.

Additives or precursors of additives which stabilize the tetragonal modification of the final zirconium dioxide product against transformation into the monoclinic modification can be added to the zirconium dioxide in a simple manner before, during or after its preparation. For example, the zirconium compounds which are used in the process of the present invention can, before they are dissolved in the formic acid/water mixture, be mixed with solid stabilizing compounds or solid precursors of such stabilizing compounds which are advantageously likewise soluble in the formic acid/water mixture.

Likewise, stabilizing additives or precursors of such additives can be added to the zirconium dioxide prepared according to the present invention after its preparation, eg. by precipitating precursors of stabilizing oxides in the form of hydrated oxides, carbonates, oxalates or similar compounds which can be converted into oxides by calcination onto the zirconium dioxide in suspension, removing the volatile constituents of the suspension and calcining the residue. Preferably, at least one stabilizing additive and/or at least one precursor of such a stabilizing additive is dissolved together with the zirconium compound in the mixture of formic acid and water. An yttrium compound is preferably used as stabilizing additive or precursor of a stabilizing additive. Preference is given to using a chloride-free yttrium compound which is soluble in the mixture of formic acid and water used as solvent. Suitable yttrium-containing compounds are, for example, yttrium oxide or yttrium carbonate. The amount of yttrium compound is generally calculated such that the zirconium dioxide after spray drying and calcination has an yttrium oxide content of from 2 to 10 mol %, preferably from 2.5 to 5 mol %.

If the stabilizing additive or the stabilizing additives and/or precursors of such additives are dissolved together with the zirconium compound in the formic acid/water mixture, the solution advantageously has a content of zirconium compounds and stabilizer compounds, calculated as the oxides to be prepared, of at least 25% by weight, preferably from 30 to 40% by weight.

EXAMPLES

Example 1

115 g of yttrium oxide (0.5 mol) were dissolved over a period of 17 minutes in a mixture of 135 g of water and 170 g of formic acid while stirring at 80° C. A viscous, completely clear solution was obtained.

Example 2

206 g of yttrium carbonate (0.5 mol) were dissolved over a period of 20 minutes in a mixture of 160 g of water and 200 g of formic acid at 70° C. with evolution of carbon dioxide. As in Example 1, a viscous, clear solution was obtained.

Example 3

A mixture of 360 g of water and 460 g of formic acid was placed 30 in an open stirred vessel and heated to about 75° C. 850 g of a basic zirconium carbonate having a zirconium dioxide content of 42% by weight were metered in over a period of 2 hours with evolution of carbon dioxide. This gave a clear solution which remained stable even after cooling to room temperature.

Example 4

1250 g of water and 1600 g of formic acid were placed in an open stirred vessel, mixed and heated to 850C. 92 g of yttrium oxide, corresponding to 0.4 mol, were then dissolved in the mixture. 3400 g of basic zirconium carbonate were then introduced and dissolved over a period of 1.5 hours with evolution of carbon dioxide. After cooling, the solution having a solids content based on zirconium dioxide/yttrium oxide in a molar ratio of 97:3 of about 35% remained completely clear.

Example 5

The solution from Example 4 was processed in a spray dryer at an outlet temperature of 140°–150° C. to give a spray-dried powder. 2480 g of a fine spray-dried powder were obtained.

2300 g of the spray-dried powder were calcined in air. For this purpose, the powder was heated to 10000C at a heating rate of 5° C./min in a flat open container of aluminum oxide. At about 350° C., the powder became dark gray; at about 700° C. it became pure white. The temperature was held at 1000° C. for 2 hours and the furnace was then allowed to cool. 1380 g of a pure white, loose zirconium dioxide powder were obtained.

Scanning electron micrographs showed that the powder was in the form of hollow spheres having an external diameter of from 5 to 20 $\mu$m and a wall thickness of about 1 $\mu$m.

The powder was suspended in the same weight of deionized water without addition of further dispersants, but with addition of a small amount of ammonia to keep the pH at from 9 to 10 which prevents dissolution of yttrium hydroxide, and this suspension was milled for one hour by means of a stirred ball mill charged with zirconium dioxide milling media having a diameter of 2 mm.

The suspension obtained was processed in a spray dryer at an outlet temperature of 140°–150° C. to give a spray-dried powder which was composed of loose agglomerates.

300 ml of butyl glycol and 168 g of polyoxymethylene were mixed in a kneader preheated to 160° C., with the polyoxymethylene dissolving. The polyoxymethylene used contained 2 mol % of butanediol formal as stabilizing copolymer. In addition, 17 g of polyethylene glycol having a molar mass of about 800 g/mol were added as dispersant, plus 23 g of polybutanediol formal having a molar mass of about 80,000 g/mol.

1000 g of the stabilized zirconium dioxide powder prepared according to the present invention were introduced into this mixture over a period of one hour while kneading. This mixture was heated further to 180° C. while kneading and the butyl glycol was drawn off during this procedure. Subsequently, kneading was continued for half an hour at 180° C., the mixture was then cooled and granulated while cooling. The granular material obtained had a proportion by volume of zirconium dioxide/yttrium oxide of 49.8% and was processed by injection molding to produce the flexural bars customary for determination of the mechanical properties.

The flexural bars were freed of polyoxymethylene and polybutanediol formal by depolymerization over a period of 4 hours without dimensional change at 130° C. in a nitrogen atmosphere containing about 2% by volume of gaseous nitric acid. The bars were then transferred to a sintering furnace and heated in air first at a heating rate of 5° C./h to 500° C., left at 500° C. for one hour and then heated at 5° C./h to 1500° C. and left at 1500° C. for two hours. The sintering furnace was then allowed to cool. The linear dimensions of the bars had shrunk by 20.3%, their density was 6.05 g/cm$^3$, ie. they had a density of virtually 100% of the theoretical density. In the "as fired" state, they had four-point flexural strengths of from 750 to 800 MPa and a fracture toughness of about 9 MPa.m$^{1/2}$ at room temperature.

Example 6

Examples 4 and 5 were repeated except that the spray-dried powder was calcined not at 1000° C., but for 2 hours at 1200° C.

Under the microscope, only hollow spheres having dimensions as in Example 5 were found. As in Example 5, an injection-molding composition was prepared, but 1150 g instead of 1000 g of the stabilized zirconium dioxide powder of the present invention were used, which led to a higher proportion by volume of solids of 53.5%. The granular material obtained was processed by injection molding, binder removal using nitric acid and sintering at 1500° C. as in Example 4 to produce test bars whose linear dimensions had shrunk by 18.8% during sintering. Their density was 6.05 g/cm$^3$, they thus had a density of virtually 100% of the theoretical density. The four-point flexural strengths in the unmachined state were from 740 to 820 MPa, the fracture toughnesses were 9 MPa m$^{1/2}$, both properties measured at room temperature.

We claim:

1. A process for the preparation of pulverulent zirconium dioxide which comprises a) dissolving a chlorine free zirconium compound in a mixture of formic acid and water in a molar ratio of from 1:1 to 1:3 as a solvent to form a solution, b) removing the volatile components from said solution to form a residue, and c) calcinating said residue.

2. The process defined in claim 1, wherein the zirconium compound is hydrated zirconium oxide or basic zirconium carbonate.

3. The process defined in claim 1, wherein the volatile components are removed by means of spray drying to form a spray-dried powder.

4. The process defined in claim 3, wherein the spray-dried powder is calcinated at from 850° to 1350° C.

5. A process for the preparation of pulverulent zirconium dioxide in the tetragonal modification which comprises i) dissolving a chlorine free zirconium compound in a mixture of formic acid and water in a molar ratio of from 1:1 to 1:3 as a solvent to form a solution, ii) removing the volatile components from said solution to form a residue, and iii) calcinating said residue.

6. The process defined in claim 5 which further comprises adding at least one additive and/or at least one precursor of an additive which stabilizes the tetragonal modification of the pulverulent zirconium dioxide to the zirconium compound before, while or after said zirconium compound is dissolved, or before or after the residue is calcinated.

7. The process defined in claim 6, wherein the additive and/or the precursor of an additive is added to the zirconium compound while said zirconium compound is dissolved.

8. The process defined in claim 7, wherein the solution contains at least 25% by weight, calculated as oxides, of the zirconium compound and the additive and/or the precursor of an additive.

9. The process defined in claim 6, wherein the additive or the precursor of an additive is at least one yttrium compound.

10. The process defined in claim 9, wherein the yttrium compound is yttrium oxide or yttrium carbonate.

11. The process defined in claim 9, wherein the yttrium compound is added in an amount of from 2 to 10 mol %, calculated as yttrium oxide and based on the pulverulent zirconium dioxide.

* * * * *